(12) United States Patent
Li et al.

(10) Patent No.: US 8,077,638 B2
(45) Date of Patent: Dec. 13, 2011

(54) METHODS AND APPARATUS FOR PROVIDING QUALITY OF SERVICE IN A PEER TO PEER NETWORK

(75) Inventors: Junyi Li, Bedminster, NJ (US); Rajiv Laroia, Far Hills, NJ (US); Saurabh Tavildar, Jersey City, NJ (US); Thomas Richardson, South Orange, CA (US); Xinzhou Wu, Monmouth Junction, NJ (US); Sanjay Shakkottai, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 821 days.

(21) Appl. No.: 12/146,888

(22) Filed: Jun. 26, 2008

(65) Prior Publication Data
US 2009/0323665 A1 Dec. 31, 2009

(51) Int. Cl.
*H04J 1/16* (2006.01)
*H04L 12/56* (2006.01)
(52) U.S. Cl. ......... 370/278; 370/230; 370/252; 370/442
(58) Field of Classification Search .................. 370/278, 370/442, 230, 252
See application file for complete search history.

(56) References Cited

U.S. PATENT DOCUMENTS

| | | | | |
|---|---|---|---|---|
| 5,151,994 | A * | 9/1992 | Wille et al. ................... | 710/116 |
| 6,973,094 | B1 | 12/2005 | Holloway et al. | |
| 7,206,320 | B2 | 4/2007 | Iwamura | |
| 2007/0149227 | A1 | 6/2007 | Parizhsky et al. | |
| 2009/0109851 | A1 * | 4/2009 | Li et al. ......................... | 370/235 |

FOREIGN PATENT DOCUMENTS

| EP | 1909526 A2 | 4/2008 |
|---|---|---|
| WO | WO2009009569 | 1/2009 |

OTHER PUBLICATIONS

International Search Report and the Written Opinion—PCT/US2008/081203, International Search Authority—European Patent Office—May 25, 2009.
Yung Yi et al: "Learning contention patterns and adapting to load/topology changes in a MAC scheduling algorithm" Wireless Mesh Networks, 2006. WIMESH 2006. 2nd IEEE Workshop on, IEEE, PI, Jan. 1, 2006, pp. 23-32, XP031012160 ISBN: 978-1-4244-0732-3.

* cited by examiner

*Primary Examiner* — John Pezzlo
(74) *Attorney, Agent, or Firm* — Peng Zhu; James K. O'Hare

(57) ABSTRACT

Methods and apparatus related to scheduling traffic slots in a wireless communications system, e.g., an ad hoc peer to peer communications network are described. An implemented timing structure includes multiple traffic transmission slots and multiple request blocks with different priorities corresponding to a traffic transmission slot. A wireless terminal determines its own block priority level. If a wireless terminal's determined block priority level is the highest block priority level the wireless terminal is allowed to transmit a traffic transmission request in the highest traffic transmission request block; otherwise, the wireless terminal is restricted from transmitting a traffic transmission request in the highest priority request block. A wireless terminal monitors for request and/or request response activity corresponding to other connections high priority block signaling, and uses the collected information to determine its own block priority.

35 Claims, 11 Drawing Sheets

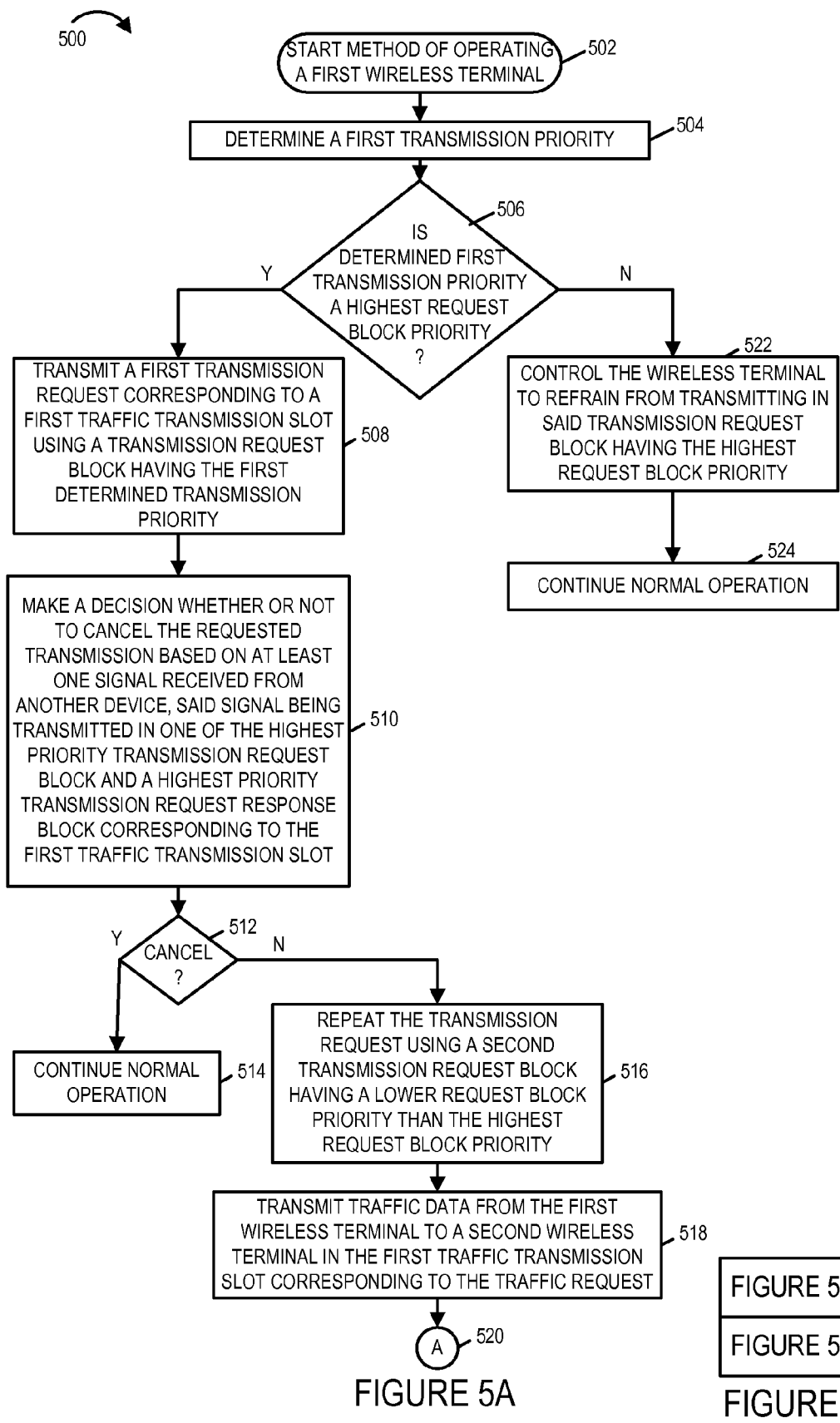

METHODS AND APPARATUS FOR PROVIDING QUALITY OF SERVICE IN A PEER TO PEER NETWORK

FIELD

Various embodiments relate to wireless communications, and more particularly, to methods and apparatus related to scheduling air link resources in a distributed wireless network.

BACKGROUND

Some wireless communications systems implement a centralized controller such as a system controller or a base station to control and coordinate the allocation of traffic segments in a region, e.g., a cell. In such a centralized system different quality of service requirements and/or needs corresponding to different connections and/or different wireless terminals can be taken into account by the centralized controller which has an overall view of ongoing operations and can make intelligent tradeoff decisions.

However, in a decentralized wireless network such as a peer to peer ad-hoc network, lacking such a centralized controller, it becomes rather difficult to coordinate scheduling of traffic segments and to accommodate different and/or changing quality of service requirements corresponding to different wireless terminals and/or connections. Accordingly there is a need for novel methods and apparatus which support quality of service differentiations in a distributed wireless network such as an ad hoc peer to peer network. It would be advantageous if such methods and apparatus supporting quality of service differentiations in such a distributed network allowed for coordinated quality of service determinations by individual devices in a local vicinity. It would also be beneficial if techniques were employed which facilitated such methods and apparatus without having to add large amounts of overhead signaling which would consume air link resource which could otherwise be employed to carry actual traffic transmission signals.

SUMMARY

Various embodiments are directed to methods and apparatus for supporting multiple levels of Quality of Service in a distributed wireless communications system, e.g., a peer to peer communications network lacking centralized control. An exemplary timing structure, used in some embodiments, includes multiple request blocks corresponding to a traffic transmission slot, and the different request blocks are associated with different request block priorities. In some embodiments, an individual wireless terminal corresponding to an active connection makes a determination as to its request block priority level, e.g., on a per traffic transmission slot basis. If the wireless terminal determines that its request block priority is the highest request block priority it is allowed to transmit a traffic transmission request in the highest priority request block; otherwise, it is restricted from transmitting a traffic transmission request in the highest priority request block. A wireless terminal, by monitoring and tracking highest priority request block requests and/or request responses corresponding to other connections in its local vicinity, and using such information in its request block priority determination, is able to be aware of system loading considerations and/or adjust to accommodate changing traffic needs in the system.

An exemplary method of operating a first wireless terminal to communicate with a second wireless terminal in a network wherein individual traffic transmission slots are associated with multiple request blocks and wherein different request blocks corresponding to a traffic transmission slot have different request block priorities is described. The exemplary method of operating the first wireless terminal includes: determining a first transmission priority; and when said determined transmission priority is a highest request block priority, transmitting a first transmission request corresponding to a first traffic transmission slot using a transmission request block having the first determined transmission priority.

An exemplary first wireless terminal, in accordance with some embodiments, comprises: a priority determination module for determining a first transmission priority for a first traffic transmission slot, said first traffic transmission slot being part of a timing structure including transmission request blocks and traffic transmission slots, wherein multiple transmission request blocks are associated with an individual traffic transmission slot and wherein different transmission request blocks corresponding to an individual traffic transmission slot have different request block priorities; a wireless transmitter module; and a transmission request control module for controlling the wireless transmitter module to transmit a transmission request corresponding to a first traffic transmission slot using a transmission request block having the first determined transmission priority when said determined first transmission priority is a highest request block priority.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
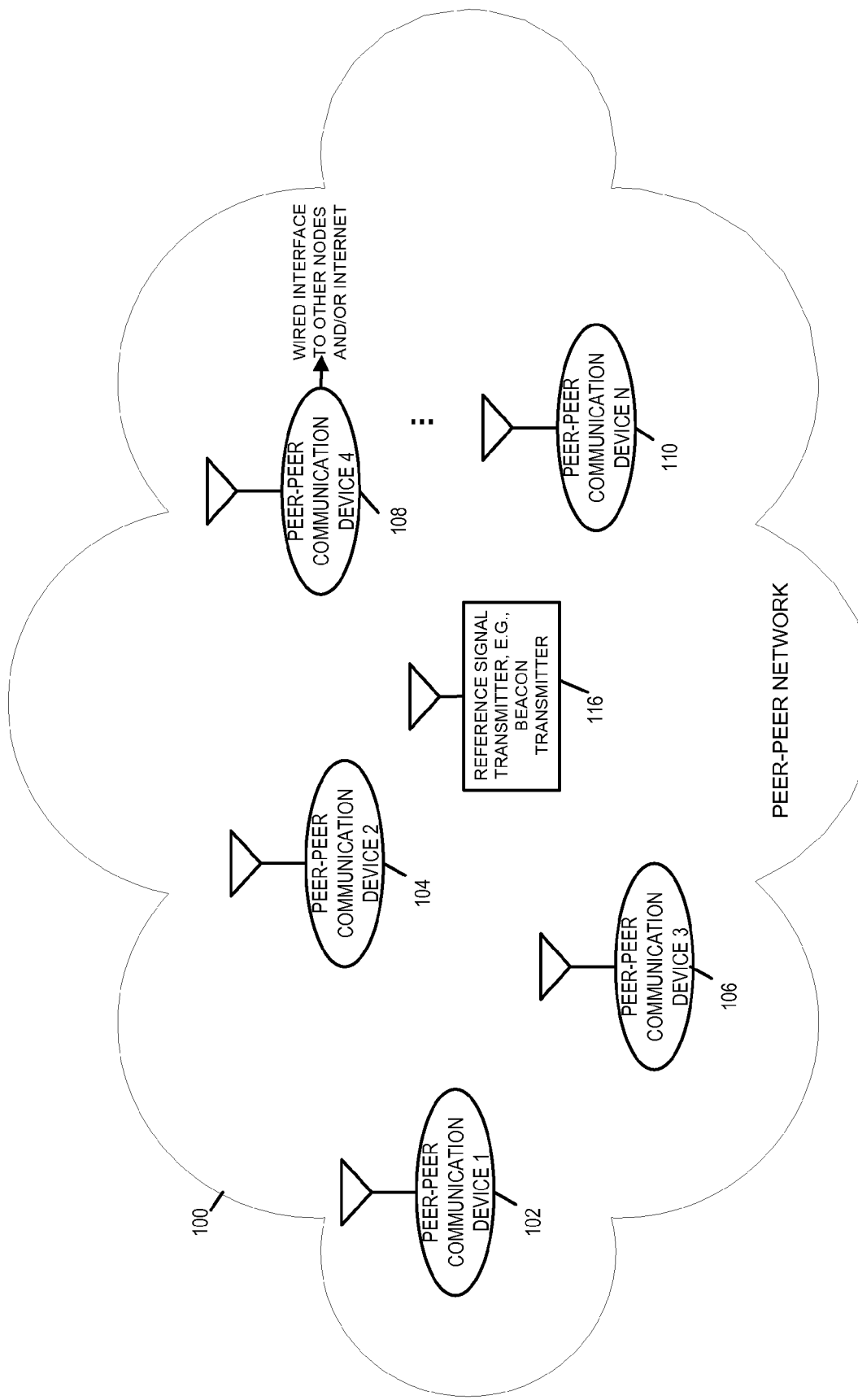
FIG. 1 is a drawing of an exemplary peer to peer network in accordance with an exemplary embodiment.

FIG. 1 is a drawing of an exemplary peer to peer network 100, e.g., an ad-hoc communications network, in accordance with an exemplary embodiment. Exemplary peer to peer network 100 includes a plurality of wireless devices supporting peer to peer communications (peer to peer communications device 1 102, peer to peer communications device 2 104, peer to peer communications device 3 106, peer to peer communications device 4 108, . . . , peer to peer communications device N 110) and a reference signal transmitter 116, e.g., a beacon transmitter.

The wireless devices (102, 104, 106, 108, . . . , 110) in the communications network 100 can establish connections with one another. There is a recurring timing structure used in the network 100 and signals, e.g., OFDM beacon signals, from reference signal transmitter 116, may be used by a wireless device to synchronize with respect to the timing structure. Alternatively, a signal used to synchronize with the timing structure may be sourced from another device, e.g., a GPS transmitter, a base station or another peer to peer device. The timing structure used in the network includes a plurality of individual traffic slots with multiple request blocks corresponding to a traffic slot. The different request blocks associated with a traffic slot have different request block priorities. Corresponding to a traffic slot, a connection is associated with a transmission unit in a highest priority request block and a transmission unit in a lower priority request block. Whether or not a wireless terminal having a connection is allowed to transmit a request in the highest priority transmission request block is determined as a function of a transmission priority determination made by the wireless terminal. A wireless terminal, in some embodiments, uses historical information regarding detected requests and/or request responses corresponding to other connections corresponding to prior traffic slots in making a priority determination. Access to the highest priority transmission request block can, and sometimes does, increase the likelihood that a wireless terminal will be permitted to transmit in a corresponding traffic transmission slot. Thus access to the highest priority transmission request block can be, and sometimes is, utilized to implement quality of service control in a distributed wireless network.

Figure 2:
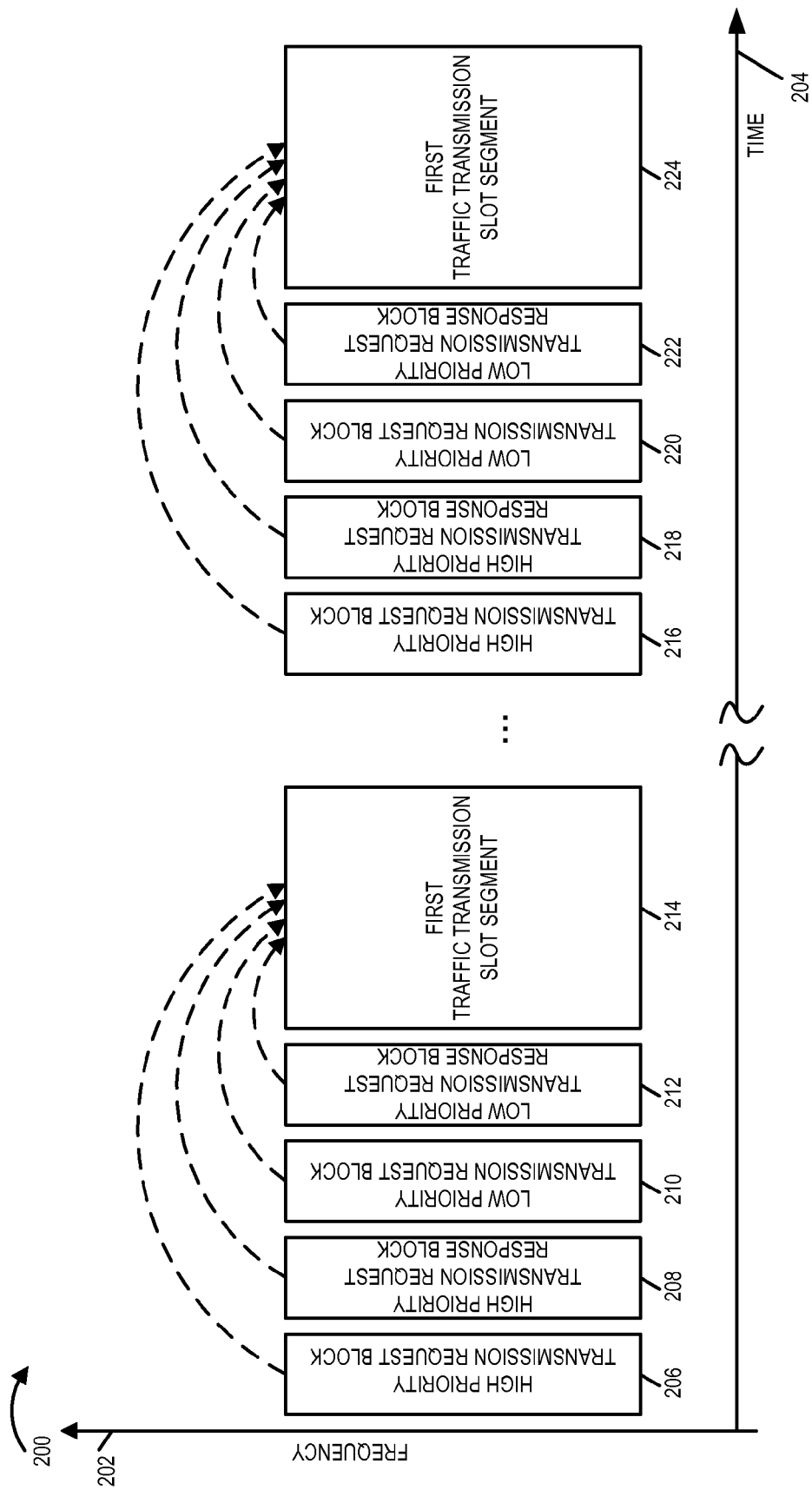
FIG. 2 is a drawing illustrating an exemplary recurring timing structure implemented in an exemplary peer to peer network.

FIG. 2 is a drawing 200 illustrating an exemplary recurring timing structure implemented in an exemplary peer to peer network. Vertical axis 202 represents frequency, e.g., OFDM tones, while horizontal axis 204 represents time. In this exemplary timing structure individual traffic transmission slots are associated with multiple request blocks and the different request bocks corresponding to an individual traffic transmission slot have different request block priorities. In addition, in this example, each request block has a corresponding request response block. More specifically, high priority transmission request block 206, high priority transmission request response block 208, low priority transmission request block 210 and low priority transmission request block 212 are associated with first traffic transmission slot segment 214. Similarly, high priority transmission request block 216, high priority transmission request response block 218, low priority transmission request block 220 and low priority transmission request block 222 are associated with Nth traffic transmission slot segment 224.

Figure 3:
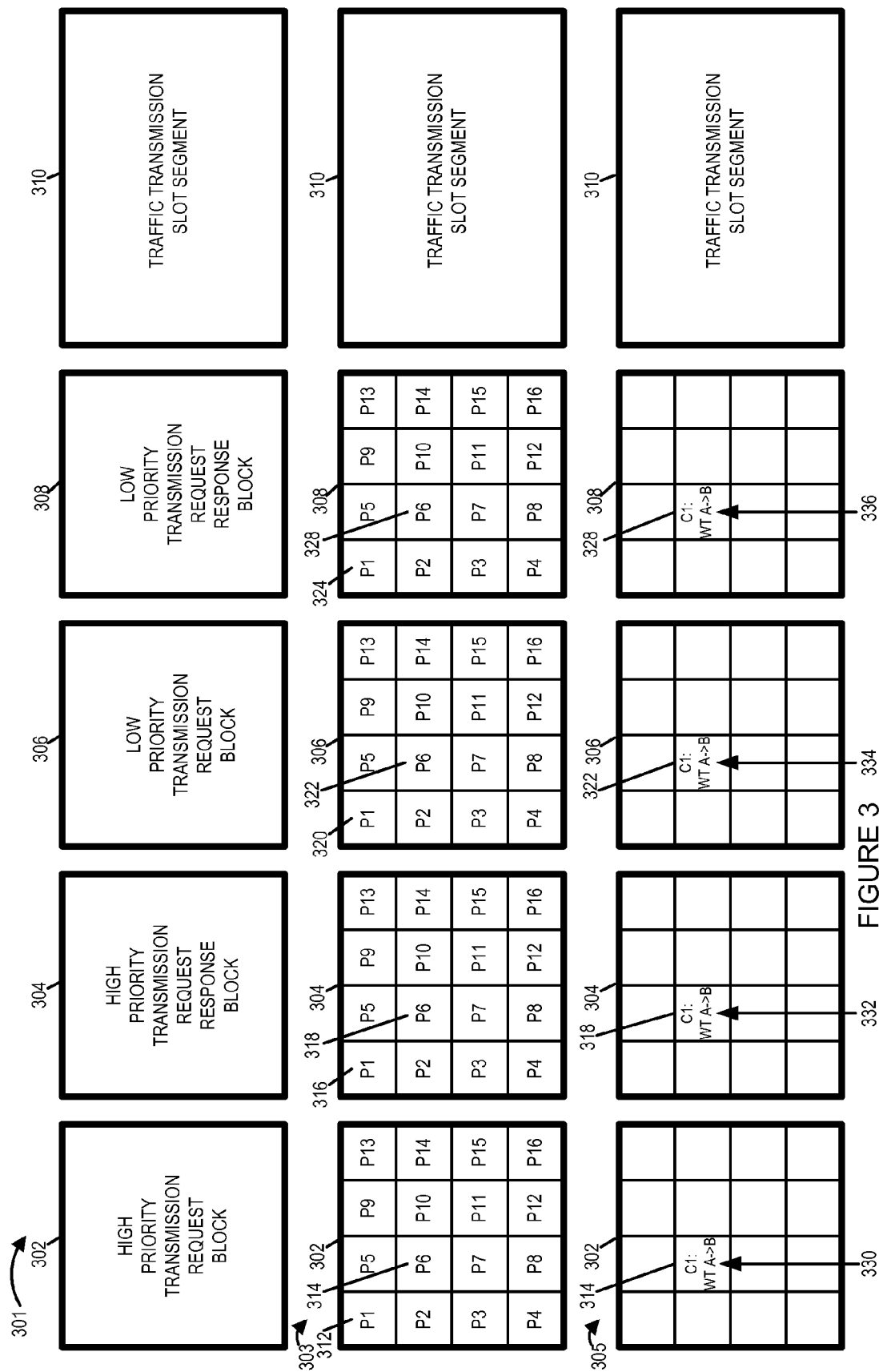
FIG. 3 illustrates a more detailed representation of request block and request response block air link resources corresponding to a traffic transmission slot in one exemplary embodiment.

FIG. 3 illustrates a more detailed representation of request block and request response block air link resources corresponding to a traffic transmission slot in one exemplary embodiment. Drawing 301 illustrates a set of air link resources including high priority transmission request block 302, high priority transmission request response block 304, low priority transmission request block 306, low priority transmission request response block 308 and traffic transmission slot segment 310. Air link resources (302, 304, 306, 308, 310) are, e.g., one of the set of air link resources (206, 208, 210, 212, 214) or (216, 218, 220, 222, 224) of FIG. 2.

Drawing 303 illustrates a more detailed representation of the request blocks (302, 306) and the request response blocks (304, 308). In this example, each of the blocks (302, 304, 306, 308) is partitioned into 16 dedicated transmission units and different transmission units within a block are associated with different transmission unit priorities. An individual transmission unit is, e.g., an OFDM tone-symbol, representing an OFDM tone for an OFDM symbol transmission time interval. In this example P1 represents the highest transmission unit priority in a block while P16 represents the lowest transmission unit priority in the block. Exemplary transmission unit 312 in high priority transmission request block 302 has priority P1, while exemplary transmission unit 314 in high priority transmission request block 302 has priority P6. Exemplary transmission unit 316 in high priority transmission request response block 304 has priority P1, while exemplary transmission unit 318 in high priority transmission request block 304 has priority P6. Exemplary transmission unit 320 in low priority transmission request block 306 has priority P1, while exemplary transmission unit 322 in low priority transmission request block 306 has priority P6. Exemplary transmission unit 324 in low priority transmission request response block 308 has priority P1, while exemplary transmission unit 328 in low priority transmission request block 308 has priority P6.

Drawing 305 illustrates that a set of transmission units is dedicated to a connection which is held by a pair of wireless terminals. Consider the illustrated example of drawing 305 described below. Transmission unit 314 in high priority transmission request block 302 is associated with connection identifier C1 which is currently associated with the connection from WT A to WT B as indicated by arrow 332, and this transmission unit 314 may, and sometimes does, carry a transmission request signal from WT A to WT B requesting to transmit traffic signals in traffic transmission slot segment 310. Transmission unit 318 in high priority transmission request response block 304 is associated with connection identifier C1 which is currently associated with the connection from WT A to WT B as indicated by arrow 330, and transmission unit 318 may, and sometimes does, carry a transmission request response signal from WT B to WT A in response to the request of transmission unit 314.

Transmission unit 322 in low priority transmission request block 306 is associated with connection identifier C1 which is currently associated with the connection from WT A to WT B as indicated by arrow 334, and this transmission unit 322 may, and sometimes does, carry a transmission request signal from WT A to WT B requesting to transmit traffic signals in traffic transmission slot segment 310. Transmission unit 328 in low priority transmission request response block 308 is associated with connection identifier C1 which is currently associated with the connection from WT A to WT B as indicated by arrow 336, and transmission unit 328 may, and sometimes does carry a transmission request response signal from WT B to WT A in response to the request of transmission unit 322.

Figure 4:
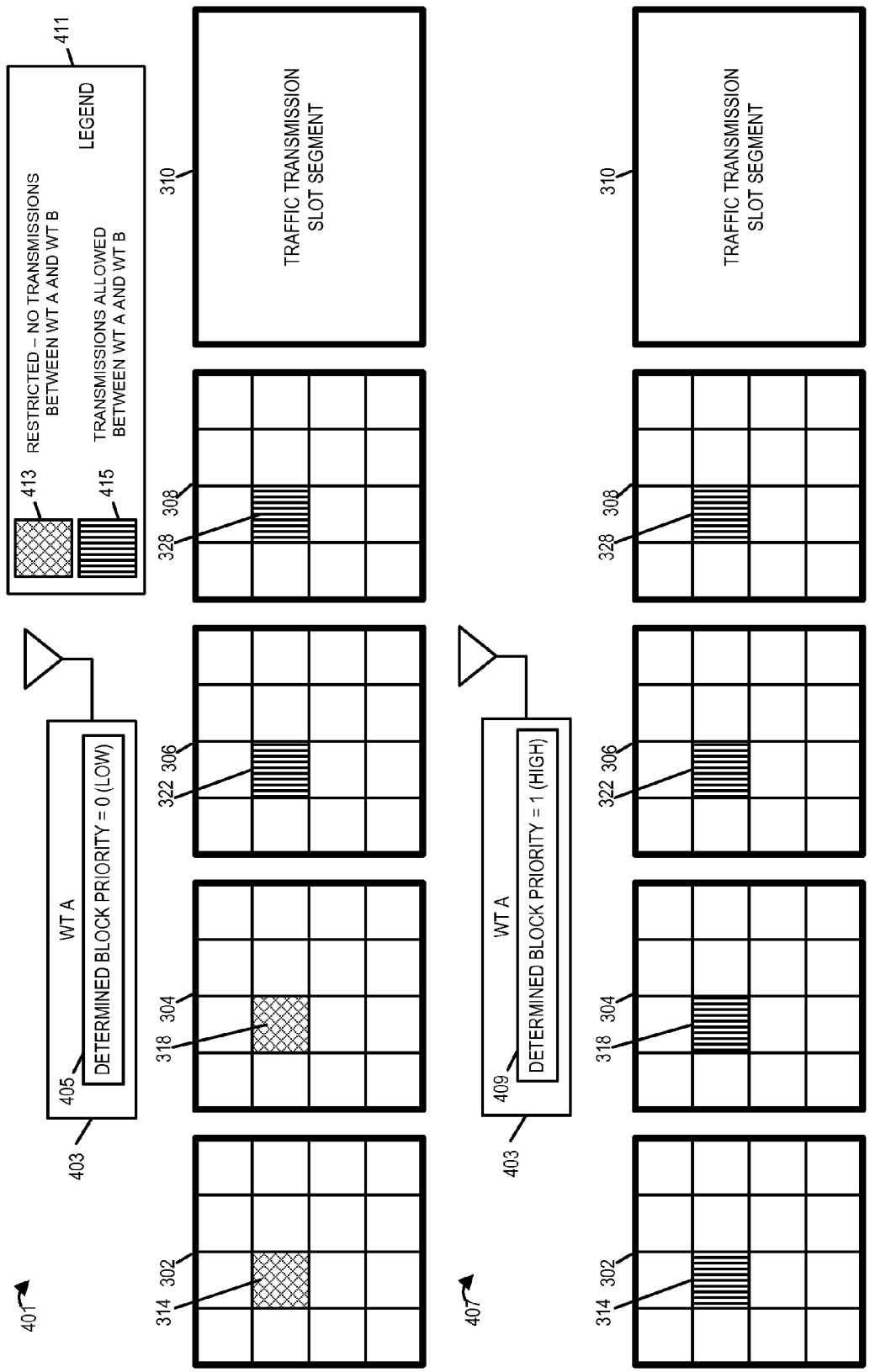
FIG. 4 is a drawing illustrating an exemplary set of air link resources associated with a connection, exemplary block priority determinations, and air link resource usage implementation rules in accordance with an exemplary embodiment.

FIG. 4 is a drawing illustrating an exemplary set of air link resources associated with a connection, exemplary block priority determinations, and air link resource usage implementation rules in accordance with an exemplary embodiment. The air link resources illustrated in FIG. 4 are the same as described in FIG. 3. Legend 411 indicates that squares with crosshatch shading such as square 413 represent that transmission unit is restricted, and there are to be no transmission between WT A and WT B using that transmission unit. Legend 411 also indicates that squares with vertical line shading such as square 415 represent that transmission are allowed between WT A and WT B.

More specifically drawing 401 of FIG. 4 illustrates that exemplary wireless terminal A 403 has a determined block priority to be equal to 0 as indicated by information 405, which in this embodiment represents low block priority. Therefore, transmission unit 314 of high priority transmission request block 302 is not allowed to be used by WT A to send a traffic transmission request to WT B. Similarly transmission unit 318 of high priority transmission request response block 304 is not allowed to be used by WT B to send a request response signal to WT A. However, transmission unit 322 in low priority transmission request response block 306 may be, and sometimes is, used by WT A to transmit a traffic transmission request signal to WT B. Similarly the transmission unit 328 in low priority transmission request response block 308 may be, and sometimes is, used by WT B to transmit a transmission request response signal, e.g., an RX echo signal to WT A.

Drawing 407 of FIG. 4 illustrates the case where exemplary wireless terminal A 403 has a determined block priority equal to 1 as indicated by information 409, which in this embodiment represents high block priority. Therefore transmission unit 314 of high priority transmission request block 302 can be, and sometimes is, used by WT A to send a traffic transmission request to WT B. Similarly transmission unit 318 of high priority transmission request response block 304 can be, and sometimes is, used by WT B to send a request response signal to WT A. Transmission unit 322 in low priority transmission request response block 306 may be, and sometimes is, used by WT A to transmit a traffic transmission request signal to WT B. Similarly the transmission unit 328 in low priority transmission request response block 308 may be, and sometimes is, used by WT B to transmit a transmission request response signal, e.g., an RX echo signal to WT A.

Figure 5B:
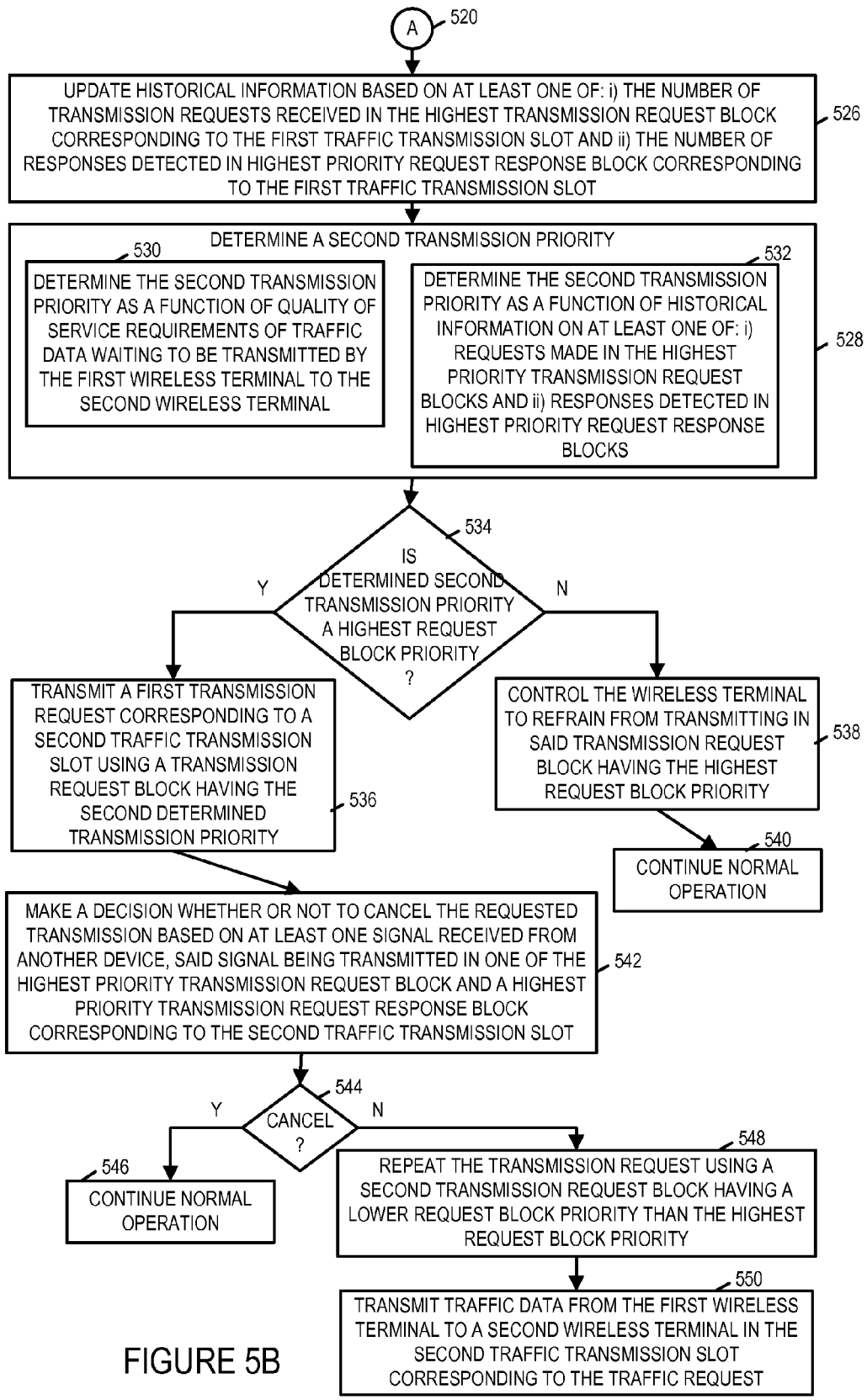
FIG. 5, comprising the combination of FIG. 5A and FIG. 5B, is a flowchart of an exemplary method of operating a first wireless terminal to communicate with a second wireless terminal in a network, wherein individual traffic transmission slots are associated with multiple request blocks and wherein different request blocks corresponding to a traffic transmission slot have different request block priorities.

FIG. 5, comprising the combination of FIG. 5A and FIG. 5B, is a flowchart 500 of an exemplary method of operating a first wireless terminal to communicate with a second wireless terminal in a network, wherein individual traffic transmission slots are associated with multiple request blocks and wherein different request blocks corresponding to a traffic transmission slot have different request block priorities. In some such embodiments corresponding to a traffic transmission slot, a transmission request block having the highest request block priority temporarily precedes a transmission request block having a lower request block priority. Operation of the exemplary method starts in step 502 where the first wireless terminal is powered on and initialized and proceeds to step 504.

In step 504 the first wireless terminal determines a first transmission priority. In some embodiments, the first wireless terminal has a dedicated transmission unit in the highest priority transmission request block corresponding to the first traffic transmission slot and a dedicated transmission unit in a lower priority transmission request block corresponding to the first traffic transmission slot. In some embodiments, at most two different transmission request block priorities are supported for the first traffic transmission slot. In other embodiments, more than two different transmission request block priorities are supported for the first traffic transmission slot. Then in step 506, the first wireless terminal proceeds as a function of the first transmission priority determination of step 504. If the determined first transmission priority is a highest request block priority, then operation proceeds from step 506 to step 508. However, if the determined first transmission priority is not a highest request block priority, then operation proceeds from step 506 to step 522.

Returning to step 508, in step 508 the first wireless terminal transmits a first transmission request corresponding to a first transmission slot using a transmission request block having the first determined priority. Operation proceeds from step 508 to step 510. In step 510, the first wireless terminal makes a decision whether or not to cancel the requested transmission based on at least one signal received from another device, said signal being transmitted being transmitted in one of the highest priority transmission request block and a highest priority transmission request response block corresponding to the first transmission slot.

In some embodiments, the first wireless terminal has a dedicated transmission unit with the highest priority transmission request response block and different transmission units within the highest priority request response block have different transmission unit priorities. In some such embodiments, making the decision of step 510 is performed as a function of the different transmission unit priorities when said signal received from another device is a signal received in the highest priority request response block.

Operation proceeds from step 510 to step 512. In step 512 operation proceeds as a function of the decision whether or not to cancel the requested transmission. If the decision is to cancel, then operation proceeds from step 512 to step 514, where normal operations continue. However, if the decision of step 510 is not to cancel the requested transmission, then operation proceeds from step 512 to step 516. In step 516 the first wireless terminal repeats the transmission request of step 508 using a second transmission request block having a lower request block priority than the highest request block priority. Operation proceeds from step 516 to step 518. In step 518 the first wireless terminal transmits traffic data from the first wireless terminal to a second wireless terminal in the first traffic transmission slot which corresponds to the traffic request of step 508 and step 516.

Operation proceeds from step 518 via connecting node A 520 to step 526. In step 526 the first wireless terminal updates historical information based on at least one of: i) the number of transmission requests received in the highest transmission request block corresponding to the first traffic transmission slot and ii) the number of responses detected in the highest priority request response block corresponding to the first traffic transmission slot. In some embodiments, at times, the historical information includes information corresponding to at least 50 preceding traffic transmission slots. Operation proceeds from step 526 to step 528.

In step 528 the first wireless terminal determines a second transmission priority, the second transmission priority relating to a second traffic transmission slot. Step 528 includes one or more of sub-steps 530 and 532. In sub-step 530 the first wireless terminal determines the second transmission priority as a function of quality of service requirements of traffic data waiting to be transmitted by the first wireless terminal to the second wireless terminal. In sub-step 532 the first wireless terminal determines the second transmission priority as a function of historical information on at least one of: i)

requests made in the highest priority transmission request blocks and ii) responses detected in highest priority request response blocks.

Operation proceeds from step 528 to step 534. If the determined second transmission priority is a highest request block priority, then operation proceeds from step 534 to step 536. However, if the determined second transmission priority is not a highest request block priority, then operation proceeds from step 534 to step 538.

Returning to step 536, in step 536 the first wireless terminal transmits a first transmission request corresponding to a second traffic transmission slot using a transmission request block have the second determined priority which is the highest request block priority. Operation proceeds from step 536 to step 542. In step 542 the first wireless terminal makes a decision whether or not to cancel the requested transmission based on at least one signal received from another device, said signal being transmitted in one or a highest priority transmission request block and a highest priority transmission request response block corresponding to the second traffic transmission slot. Operation proceeds from step 542 to step 544.

In step 544 operation proceeds as a function of the decision whether or not to cancel the requested transmission for the second traffic transmission slot. If the decision of step 542 is to cancel, then operation proceeds from step 544 to step 546 where normal operations continue. However, if the decision of step 542 is not to cancel the requested transmission, then operation proceeds from step 544 to step 548. In step 548 the first wireless terminal repeats the transmission request of step 536 using a second transmission request block having a lower request block priority than the highest request block priority. Operation proceeds from step 548 to step 550. In step 550 the first wireless terminal transmits traffic data from the first wireless terminal to a second wireless terminal in the second traffic transmission slot which corresponds to the traffic request of step 536 and step 548.

Figure 6:
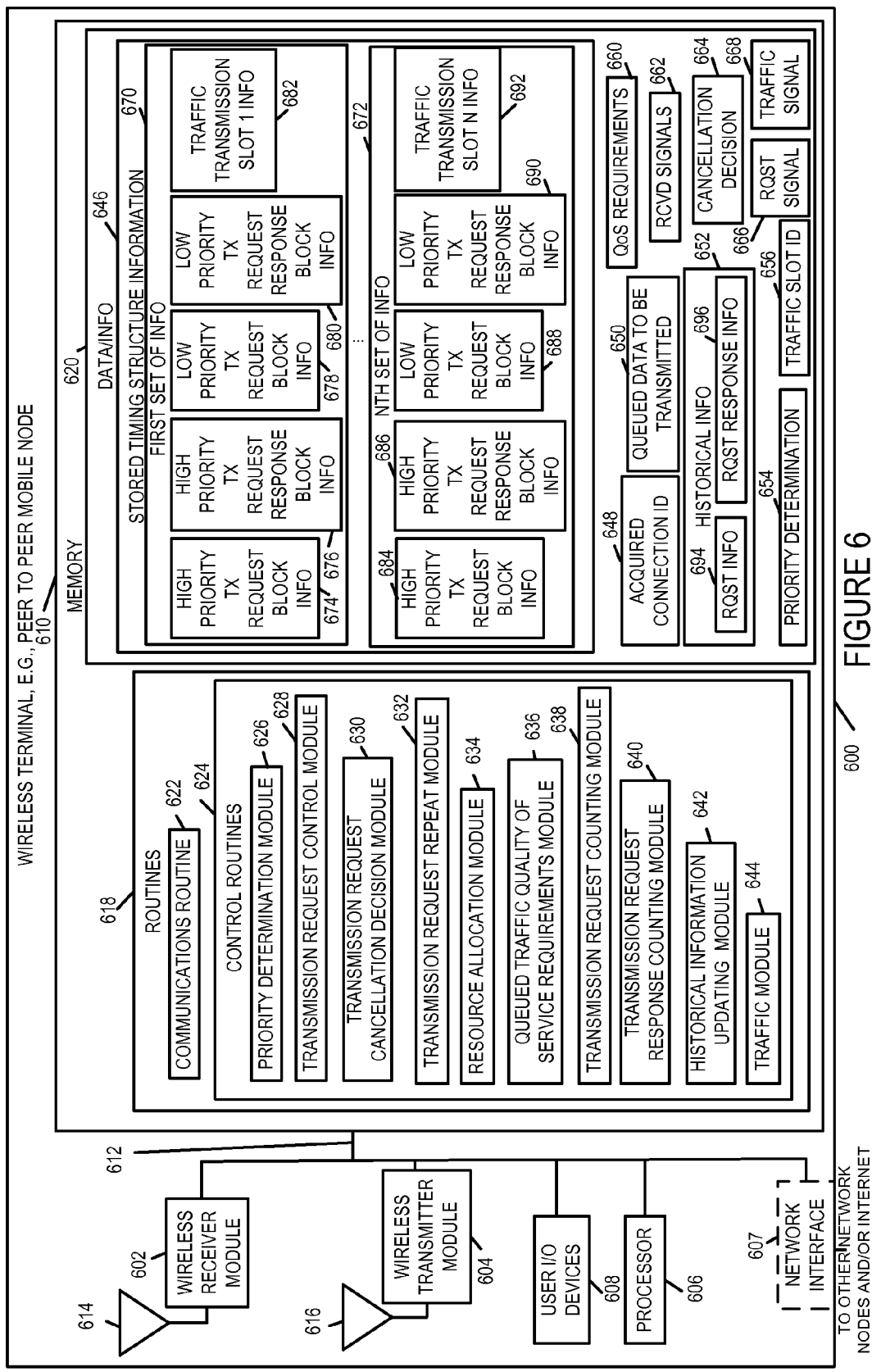
FIG. 6 is a drawing of an exemplary wireless terminal, e.g., a peer to peer mobile node in accordance with an exemplary embodiment.

FIG. 6 is a drawing of an exemplary wireless terminal 600, e.g., a peer to peer mobile node in accordance with an exemplary embodiment. Exemplary wireless terminal 600 includes a wireless receiver module 602, a wireless transmitter module 604, a processor 606, user I/O devices 608, and a memory 610 coupled together via a bus 612 over which the various elements may exchange data and information. In some embodiments, the wireless terminal 600 also includes a network interface 607 coupled to bus 612, and the wireless terminal can be coupled to other network nodes and/or the Internet via a backhaul network using network interface 607.

Memory 610 includes routines 618 and data/information 620. The processor 606, e.g., a CPU, executes the routines 618 and uses the data/information 620 in memory 610 to control the operation of the wireless terminal 600 and implement methods, e.g., the method of flowchart 500 of FIG. 5 or the method of flowchart 900 of FIG. 9.

Wireless receiver module 602, e.g., an OFDM and/or CDMA receiver, is coupled to receive antenna 614 via which the wireless terminal 600 receives signals from other wireless devices. Received signals include, e.g., connection establishment signals, traffic transmission request signals, traffic transmission request response signals, and traffic signals.

Wireless transmitter module 604, e.g., an OFDM and/or CDMA transmitter, is coupled to transmit antenna 616 via which the wireless terminal 600 transmits signals to other wireless devices. Transmitted signals include: connection establishment signals, traffic transmission request signals, traffic transmission request response signals, and traffic signals. In some embodiments, the same antenna is used for the receiver and transmitter.

Routines 618 include a communications routine 622 and control routines 624. The communications routine 622 implements the various communications protocols used by the wireless terminal 600. Control routines 624 include a priority determination module 626, a transmission request control module 628, a transmission request cancellation decision module 630, a transmission request repeat module 632, a resource allocation module 634, a queued traffic quality of service requirements module 636, a transmission request counting module 638, a transmission request response counting module 640, a historical information updating module 642 and a traffic module 644.

Data/information 620 includes stored timing structure data 646, an acquired connection identifier 648, queued data to be transmitted 650, Quality of Service requirements 660, received signals 662, historical information 652, a priority determination 654, a traffic slot identifier 656, a request signal 666, a cancellation decision 664, and a traffic signal 668. The stored timing structure information 646 includes a plurality of set of information (first set of information 670, . . . , Nth set of information 672. First set of information 670 includes high priority transmission request block information 674, high priority transmission request response block information 676, low priority transmission request block information 678, low priority transmission request response block information 680 and corresponding traffic transmission slot 1 information 682. Nth set of information 672 includes high priority transmission request block information 684, high priority transmission request response block information 686, low priority transmission request block information 688, low priority transmission request response block information 690 and corresponding traffic transmission slot N information 692. Historical information 652 includes request information 694 and request response information 696.

The stored timing structure information 646 includes information indicating that there are a plurality of dedicated transmission units within a highest priority transmission request response block and different transmission units within a highest priority request response block have different transmission unit priorities. For example, see highest priority transmission request response block 304 of FIG. 3 which illustrates 16 dedicated transmission units in the request response block 304 with different transmission unit priorities (P1, P2, . . . , P16). Transmission unit priorities, in some embodiments, are associated with the location of the transmission unit within the block. In addition in some embodiments, transmission unit priorities are varied over time for a given connection, e.g., changing from one slot to the next. In some embodiments, the variation is such that on average each connection identifier corresponds to substantially the same average priority level.

On the other hand transmission block priority is determined by the wireless terminal 600's module 626 and can be used to increase or decrease the likelihood that the wireless terminal 600 will be allowed to transmit in a traffic slot.

In this embodiment, the stored timing structure information 646 indicates that a dedicated transmission unit in a highest priority transmission request block corresponding to an individual traffic slot has a corresponding dedicated transmission unit in the lower priority transmission request block corresponding to the same individual traffic transmission slot. For example, consider drawing 305 of FIG. 3 which identifies dedicated transmission unit 314 of highest priority transmission request block 302 and dedicated transmission unit 322 of low priority transmission request block 306, both associated with connection C1 and both associated with traffic transmission slot 310.

In some embodiments, the stored timing structure information 646 indicates that there are at most two different request block priorities supported for a traffic transmission slot, e.g., a high request block priority and a low request block priority. Some other embodiments, may include more that two request block priority levels, e.g., 3 sets of request blocks per traffic transmission slot and a high, medium, and low request block priority.

Priority determination module 626 is for determining transmission priority for one or more traffic transmission slots. In some embodiments, priority determination module 626 determines transmission priority on a per traffic transmission slot basis. In some embodiments, priority determination module 626 determines between a high request block priority and a low request block priority. In some other embodiments, supporting more than two request block priorities, the priority determination module 626 selects between the more than two request block priorities.

Priority determination module 626 is for determining a first transmission priority for a first traffic transmission slot, said first traffic transmission slot being part of a timing structure including transmission request blocks and traffic transmission slots, wherein multiple transmission request blocks are associated with an individual traffic transmission slot and wherein different transmission request blocks corresponding to an individual traffic transmission slot have different request block priorities.

Priority determination module 626 is also for determining a second transmission priority, at a point in time subsequent to determining the first transmission priority. The priority determination module 626 determines the second transmission priority as a function of quality of service requirements of traffic data waiting to be transmitted by the wireless terminal to a second wireless terminal. In various embodiments, the priority determination module 626 determines the second transmission priority as a function of historical information on at least one of: i) requests made in highest priority transmission request blocks and ii) responses detected in highest priority request response blocks.

Transmission request control module 628 controls the wireless transmitter module 604 to transmit a transmission request corresponding to a first traffic transmission slot using a transmission request block associated with the first traffic transmission slot having the first determined priority when the first determined priority is a highest request block priority.

Transmission request control module 628 also controls the wireless terminal to refrain from transmitting in the transmission request block having the highest request block priority when the priority determination module 626 determines that the priority for the transmission slot is different from the highest request block priority.

The timing structure, as indicated by information 646, is such that the transmission request block having the highest request block priority temporally precedes a transmission request block having a lower request block priority corresponding to the same traffic transmission slot.

The transmission request control module 628 controls the wireless transmitter module 604 to refrain from transmitting in the transmission request block having the highest request block priority which is associated with the first traffic transmission slot when the determined first transmission priority is a priority different from the highest request block priority.

Transmission request cancellation decision module 630 makes a decision whether or not to cancel a requested transmission for a transmission slot when the determined transmission block priority for the slot is the highest, the decision being based on at least one signal received from another device. The received signal is, e.g., a transmission request signal which was transmitted in a transmission request block corresponding to the same traffic transmission slot or a request response signal which was transmitted in a highest priority transmission request response block corresponding to the same traffic transmission slot.

In some embodiments, the transmission request cancellation decision module 630 makes a decision as a function of different transmission unit priorities when the received signal used in the cancellation decision is a signal received in the highest priority request response block.

Transmission request repeat module 632 controls the transmission request control module 628 to repeat a transmission request previously communicated in a highest priority transmission request block using a second transmission request block having a lower request block priority than the highest request block priority when the decision of the request block cancellation decision module 630 is not to cancel the requested transmission.

Resource allocation module 634 obtains information used to identify air link resources to be used by the wireless terminal 600 including a dedicated transmission unit in a highest priority transmission request block corresponding to an individual traffic transmission slot and a corresponding dedicated transmission unit in a lower priority transmission request block corresponding to the same individual traffic transmission slot.

Queued quality of service requirements determination module 636 determines quality of service requirements of traffic data waiting to be transmitted by the wireless terminal 600 to another wireless terminal. Quality of service requirements may, and sometimes does, vary as a function of the type of traffic, e.g., voice, image, data file, and/or requirements on the traffic delivery, e.g., latency considerations.

Transmission request counting module 638 counts the number of transmission requests received in the highest transmission request block corresponding to the a traffic transmission slot. Transmission request response counting module 640 counts the number of responses detected in a highest priority request response block corresponding to a traffic transmission slot.

Historical information updating module 642 updates historical information based on at least one of: i) the number of transmission requests received in a highest transmission request block corresponding to a traffic transmission slot and ii) the number of responses detected in a highest priority request response block corresponding to a traffic transmission slot. For example, counting information collected by modules 638 and/or 640 corresponding to a first transmission slot is used to update historical information, which is subsequently used by the priority determination module 626 when making a priority determination about a second transmission slot.

In some embodiments, at times the historical information includes information corresponding to at least 50 preceding traffic transmission slots and the priority determination module 626 makes a determination using the information corresponding to the at least 50 preceding traffic transmission slots. In some embodiments, the historical information is used in a weighted filter.

Traffic module 624 generates traffic signals and controls the wireless transmitter module 604 to transmit the generated traffic signals using a traffic transmission slot air link resource.

Acquired connection identifier 648 is a connection identifier corresponding to an established connection between wireless terminal 600 and another wireless device which is associated with a set of air link resources, e.g., dedicated request transmission units and dedicated request response transmission units in the timing structure. Acquired connection identifier 648 is an output of resource allocation module 634.

Queued data to be transmitted 650 includes user data, e.g., voice data, image data, file data, etc., waiting to be transmitted to another wireless device using one or more traffic transmission slots. QoS requirements 660 includes information identifying quality of service requirements associated with the queued data to be transmitted 650, e.g., data type information, e.g., voice or non-voice, latency information, data rate information, etc. QoS requirements information 660 is an output of queued traffic quality of services module 636 and is used as an input to priority determination module 626.

Received signals 662 include, e.g., received transmission requests corresponding to other connections and received transmission request responses corresponding to other connections, e.g., signals communicated in highest priority transmission request blocks and highest priority transmission request response blocks. Some such received signals are counted by counting modules 638 and/or 640.

Cancellation decision 664 is an output of transmission request cancellation decision module 628 and is used to determine whether a repeat request should be transmitted in a lower priority request block or whether a repeat request should not be sent in the lower priority request block.

Historical information 652 includes information being tracked, updated and stored to be available for later priority determination decisions by priority determination module 626. Request information 694 includes information collected by transmission request counting module 638 and stored by historical information updating module 642. Request response information 696 includes information collected by transmission request response counting module 640 and stored by historical information updating module 642.

Priority determination 654 is an output of priority determination module 626, e.g., one of a highest request block priority and a low request block priority.

Traffic slot identifier 656 identifies a current traffic slot from among the N potential traffic transmission slots in the recurring timing structure corresponding to information 646.

Request signal 666 is a generated traffic transmission request signal which is communicated in a transmission unit, corresponding to a connection identifier currently held by wireless terminal 600, of a transmission request block under the control of the transmission request control module 628.

Traffic signal 668 is a signal generated by traffic module 644, which conveys at least some queued data to be transmitted 650, and which is transmitted by wireless transmitter module 604 under the control of traffic module 644 using a traffic transmission slot segment for which wireless terminal 600 has received a request response signal signifying that it is allowed to transmit in that slot. In some embodiments, if an intended receiver does not acquiesce to the traffic transmission request, it does not transmit any signal on the request response transmission unit corresponding to the connection.

Figure 7:
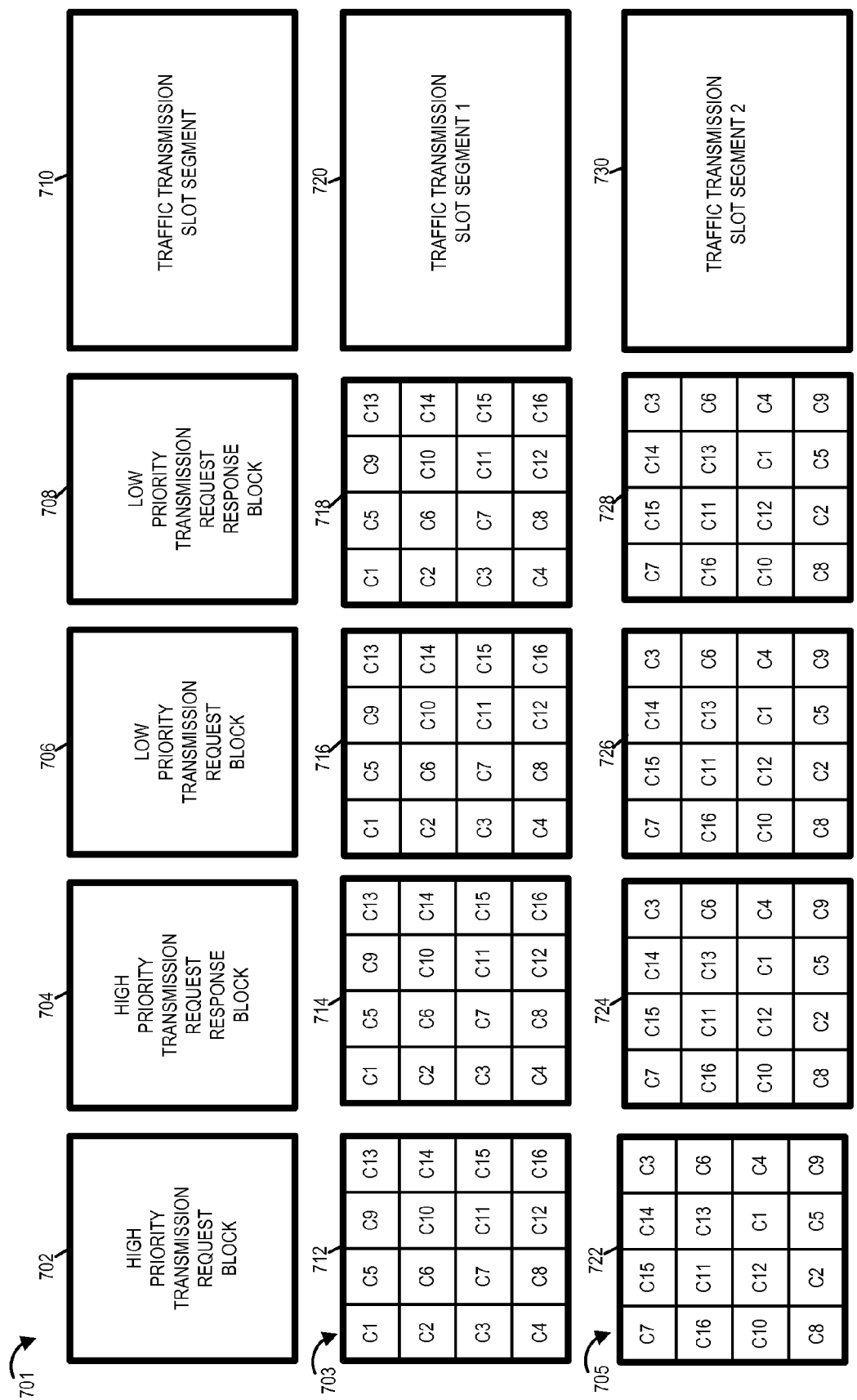
FIG. 7 illustrates exemplary air link resources in an exemplary timing structure in accordance with one exemplary embodiment.

FIG. 7 illustrates exemplary air link resources in an exemplary timing structure in accordance with one exemplary embodiment. Drawing 701 illustrates that in this exemplary embodiment for each traffic transmission slot segment 710, there is a high priority transmission request block 702, a high priority transmission request response block 704, a low priority transmission request block 706 and a low priority transmission request response block 708.

Drawing 703 illustrates exemplary mapping of transmission units within the request blocks (712, 716) and request response blocks (714, 718) to connection identifiers corresponding to traffic transmission slot segment 1 720. High priority transmission request block 712 includes 16 different transmission units associated with different connection identifiers. High priority transmission request response block 714 includes 16 different transmission units associated with different connection identifiers. Low priority transmission request block 716 includes 16 different transmission units associated with different connection identifiers. Low priority transmission request response block 718 includes 16 different transmission units associated with different connection identifiers.

Within an individual block, e.g., within a high priority request response block, a transmission unit priority is associated with each of the transmission units. For example, the transmission unit priority ordered may be that of drawing 303 of FIG. 3.

Drawing 705 illustrates exemplary mapping of transmission units within the request blocks (722, 726) and request response blocks (724, 728) to connection identifiers corresponding to traffic transmission slot segment 2 730. High priority transmission request block 722 includes 16 different transmission units associated with different connection identifiers. High priority transmission request response block 724 includes 16 different transmission units associated with different connection identifiers. Low priority transmission request block 726 includes 16 different transmission units associated with different connection identifiers. Low priority transmission request response block 728 includes 16 different transmission units associated with different connection identifiers.

Within an individual block, e.g., within a high priority request response block, a transmission unit priority is associated with each of the transmission units. For example, the transmission unit priority ordered may be that of drawing 303 of FIG. 3.

Comparing drawing 703 and drawing 705, it may be observed that transmission unit priorities associated with the same connection identifier have changed between the two slots. For example, in high priority transmission request block 712 corresponding to traffic transmission slot segment 1 720, connection C1 has the highest transmission unit priority (level 1) and connection C16 has the lowest transmission unit priority (level 16). However, in high priority transmission request block 722 corresponding to traffic transmission slot segment 2 730, connection C1 has the transmission unit priority level 11 and connection C16 has the transmission unit priority level 2.

In some embodiments, the hopping pattern between connections and request transmission units in a request block is such that each connection identifier has the same or substantially the same average transmission unit priority level, e.g., over one iteration of the recurring timing structure. In such an embodiment, from this perspective, no one connection identifier is favored over another connection identifier.

Figure 8:
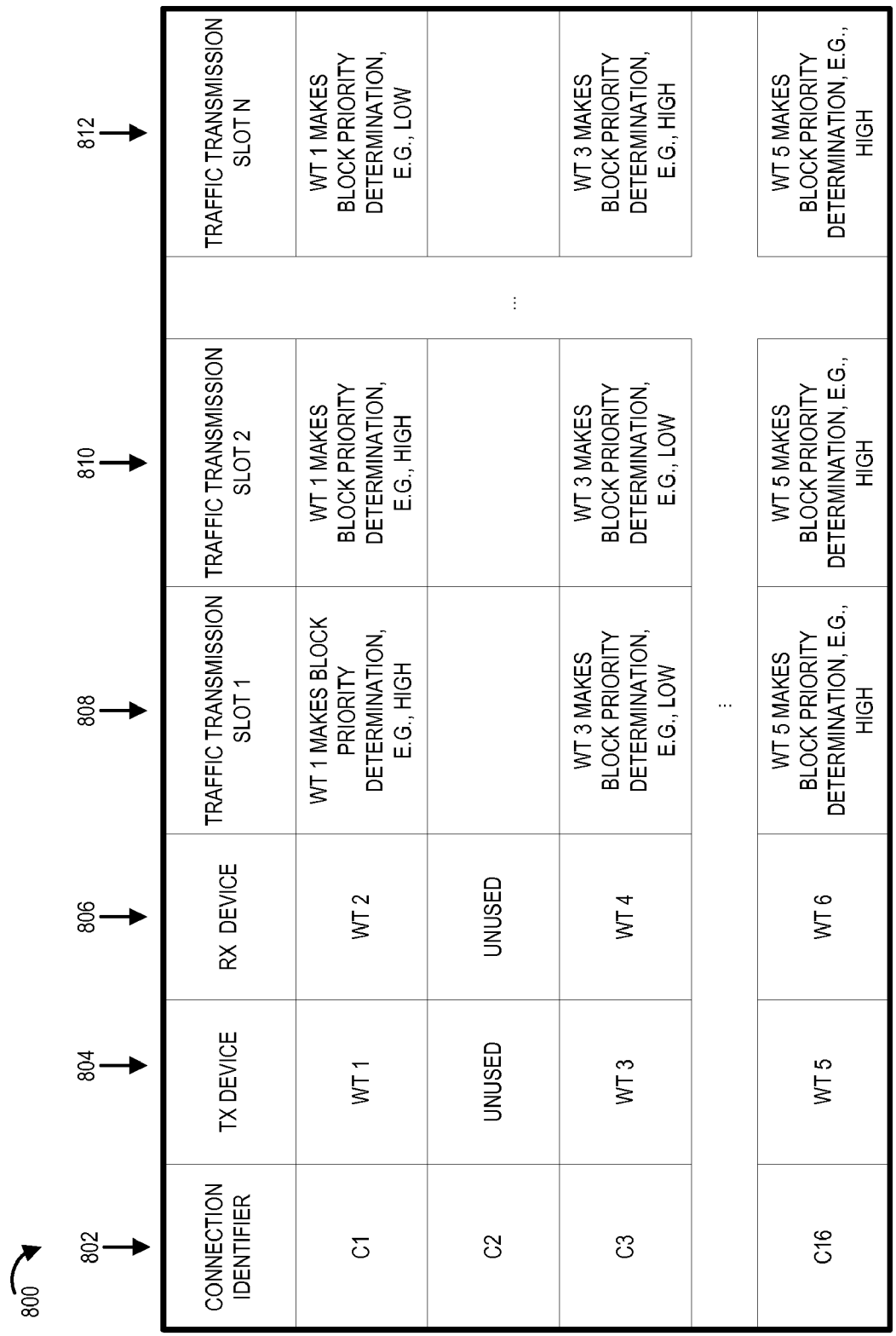
FIG. 8 illustrates the concept of wireless terminal based block priority determinations in accordance an exemplary embodiment.

Drawing 800 of FIG. 8 illustrates the concept of wireless terminal based block priority determinations in accordance an exemplary embodiment. Consider that a recurring timing structure such as that shown in FIG. 7 is being used, e.g., in a peer to peer wireless communications network lacking centralized control. In this example, assume that pairs of wireless terminals have acquired and are holding connection identifiers. First column 802 identifies the connection identifiers; second column 804 identifies the transmission device associated with sourcing traffic corresponding to the connection, while third column 806 identifies the receiver device associated with receiving traffic corresponding to the connection.

Corresponding to connection identifier 1, currently, WT 1 is the TX device while WT 2 is the RX device. Connection identifier 2 is currently unused. Corresponding to connection identifier 3, currently, WT 3 is the TX device while WT 4 is the RX device. Corresponding to connection identifier 16, currently, WT 5 is the TX device while WT 6 is the RX device.

In this exemplary embodiment, corresponding to each traffic transmission slot a wireless terminal, which is a TX device associated with a currently held connection identifier, makes a block priority determination. The request of the block priority determination determines whether or not the wireless terminal which made the determination is permitted to transmit a traffic transmission request in the high priority transmission request block corresponding to the traffic slot. Column 808 illustrates exemplary determinations corresponding to traffic transmission slot 1 808, while column 810 illustrates exemplary determinations corresponding to traffic transmission slot 2, and column 812 illustrates exemplary determinations corresponding to traffic transmission slot N.

In this example, corresponding to connection identifier 1, WT 1 determines its block priority to be (high, high, low) corresponding to slots (1, 2, N). Therefore WT 1 is allowed to transmit requests in the high priority transmission request blocks corresponding to traffic transmission slots 1 and 2, but is not allowed to transmit a request in the high priority traffic transmission slot corresponding to traffic transmission slot N.

In this example, corresponding to connection identifier 3, WT 3 determines its block priority to be (low, low, high) corresponding to slots (1, 2, N). Therefore WT 2 is not allowed to transmit a request in the high priority transmission request blocks corresponding to traffic transmission slots 1 and 2, but is not allowed to transmit a request in the high priority traffic transmission slots corresponding to traffic transmission slot N.

In this example, corresponding to connection identifier 16, WT 5 determines its block priority to be (high, high, high) corresponding to slots (1, 2, N). Therefore WT 5 is allowed to transmit a request in the high priority transmission request blocks corresponding to traffic transmission slots 1, 2, and N.

By use of wireless terminal block priority determinations and implementation of the determinations, the balance or weighting in the system with regard to different connection identifiers can be altered. In general, when a wireless terminal determines its block priority to be high it increases its likelihood that it will be allowed to transmit in the traffic transmission slot and decreases the likelihood that other connections will be allowed to transmit in the same traffic transmission slot, over the situation where a determines its block priority to be low. In this example, the control is not centralized and individual wireless terminals make block priority determinations. In various embodiments, a wireless terminals tracks activity of other connections, e.g., high priority transmission requests and request responses corresponding to other connections, stores historical information, and uses such information in its block priority determination. A block priority determined corresponding to a particular traffic transmission slot may, and sometimes does, use block priority determination information corresponding to other connections corresponding to previous slots. For example a block priority determination for slot 2 may use information from prior slots including slot 1; and a block priority determination for slot N may use information corresponding to prior slots including slot 1, slot 2, . . . , slot N−1.

In the exemplary peer to peer communications network one or multiple connections may be allowed to use the same traffic transmission slot, e.g., depending upon interference considerations. In general lower priority connections yield to higher priority connections if the interference level from the lower priority connection is unacceptable. In this exemplary embodiment, a connection corresponding to a low priority block determination is not permitted use the traffic transmission segment of the slot if it is deemed to cause an unacceptable level of interference to a connection corresponding to a high priority block determination which wants to use the same traffic transmission segment.

In the example, of FIG. 8, block priority determination are made on a per slot basis. This approach advantageously facilitates rapid adjustments in the network with regard to quality of service. In other embodiments, the block priority determination is made at a different rate, e.g., once every several slots. In still other embodiments, block priority determination occur independent of the traffic slot timing, e.g., determinations and/or changes in block priority are made due to a detected event or condition.

In the example, of FIG. 8, it shows a connection identifier being held for the set of N transmission slots. In general connection identifier acquisition and release times may, and sometimes do occur at different points throughout the timing structure.

Figures 9, 9A, 9B:
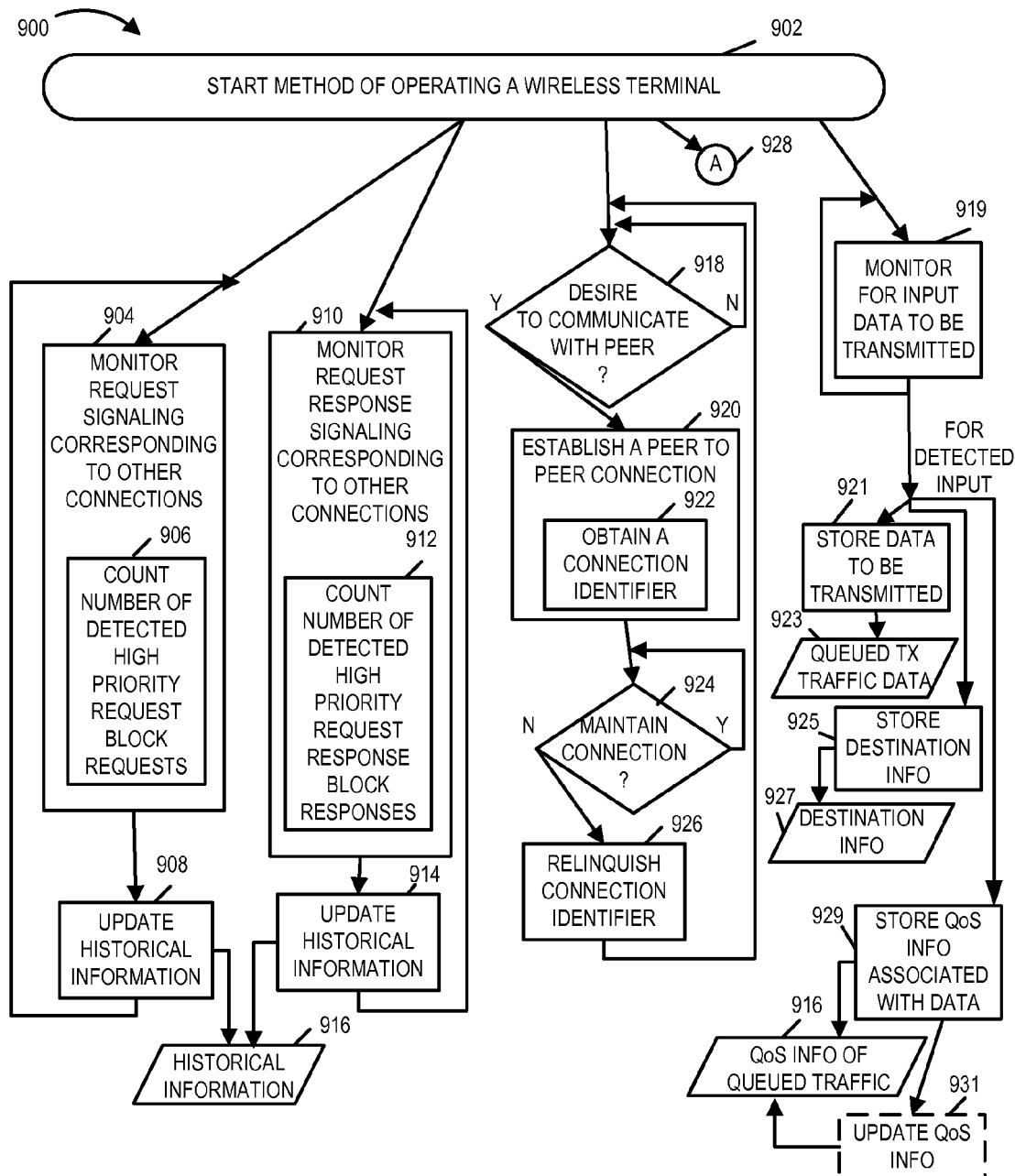
FIG. 9 comprising the combination of FIG. 9A
FIG. 9B is a flowchart of an exemplary method of operating a wireless terminal in accordance with an exemplary embodiment.
Figure 9B:
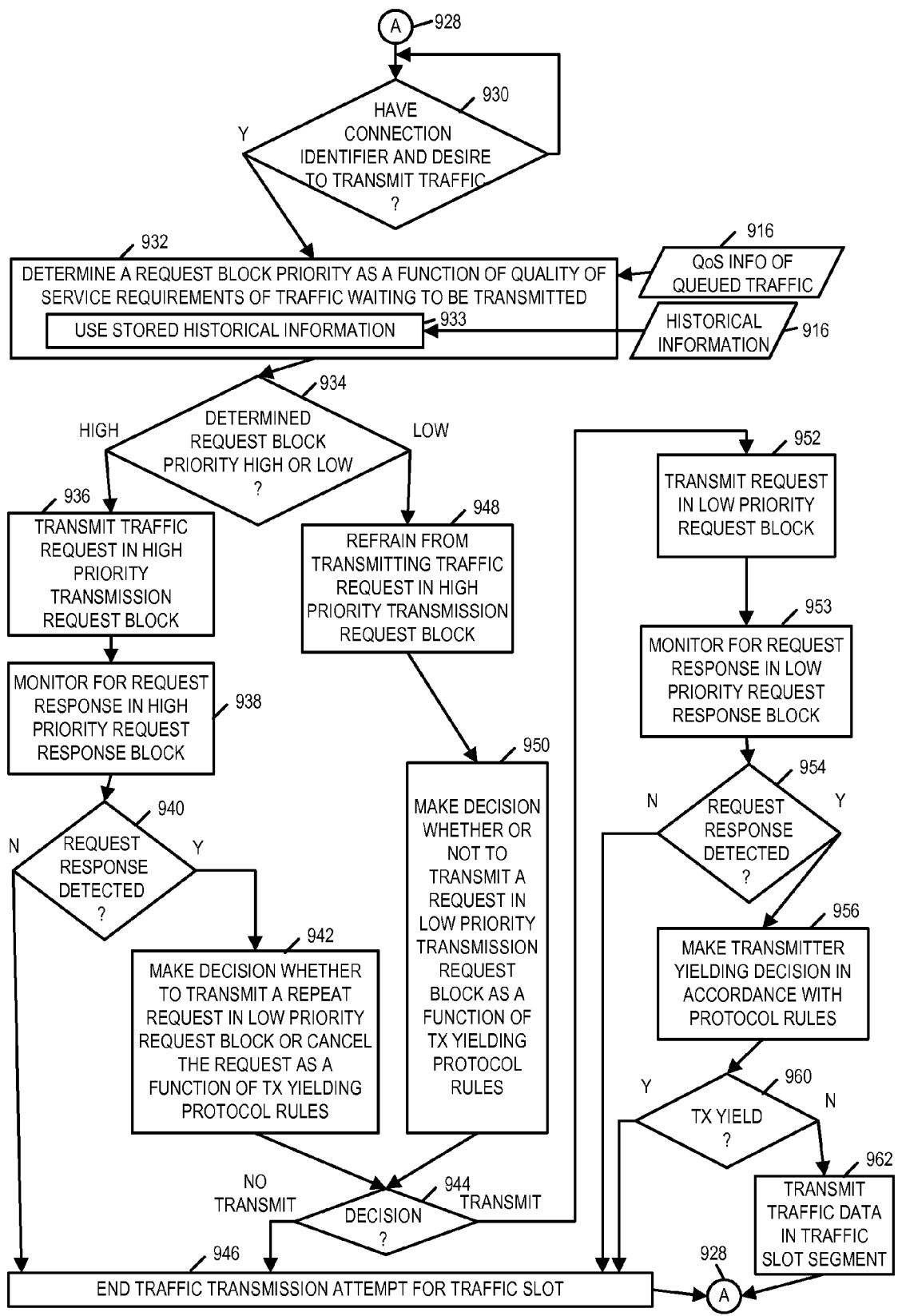

FIG. 9, comprising the combination of FIG. 9A and FIG. 9B, is a flowchart 900 of an exemplary method of operating a wireless terminal in accordance with an exemplary embodiment. Operation starts in step 902, where the wireless terminal is powered on and initialized and proceeds to step 904, step 910, step 918, step 930 via connecting node A 928, and step 919.

In step 904, the wireless terminal monitors for request signaling corresponding to other connections. Step 904 includes sub-step 906, in which the wireless terminal counts the number of detected high priority request block requests, e.g., corresponding to a traffic transmission slot. Operation proceeds from step 904 to step 908 in which the wireless terminal updates historical information 916 based on the detections and counting of step 904. Operation proceeds from step 908 to the input of step 904 for additional monitoring, e.g., on the next request block corresponding to the next traffic transmission slot.

In step 910 the wireless terminal monitors request response signaling, e.g., RX echo signals signaling positive acknowledgments to a transmission traffic request signals, corresponding to other connections. Step 910 includes sub-step 912 in which the wireless terminal counts the number of high priority request response block responses. Operation proceeds from step 910 to step 914, in which the wireless terminal updates historical information 916 based on the detections and counting of step 910. Operation proceeds from step 904 to the input of step 910 for additional monitoring, e.g., on the next request response block corresponding to the next traffic transmission slot.

Returning to step 918, in step 918 the wireless terminal decides if it desires to communicate with a peer. If it does not currently desire to communicate with a peer then operation proceeds back to the input of step 918. However, if the wireless terminal does desire to communicate with a peer, then operation proceeds from step 918 to step 920. In step 920 the wireless terminal establishes a peer to peer connection, e.g., via a signaling exchange with the peer device that it desires to communicate with. Step 920 includes sub-step 922 in which the wireless terminal obtains a connection identifier. Operation proceeds from step 920 to step 924. In step 924 the wireless terminal tests if it still desires to maintain the established connection. If the wireless terminal wishes to maintain the connection, operation proceeds back to the input of step 924 for another test at a later time. However, if the wireless terminal does not wish to maintain the connection then operation proceeds from step 924 to step 926 in which the wireless terminal relinquishes the connection identifier. In some embodiments, the wireless terminal relinquishes the connection identifier by controlled operation including ceasing to transmit one or more expected signals. In some other embodiments the wireless terminal relinquishes the connection identifier by controlled operations including transmitting a connection de-establishment signal to the other peer to peer device which is part of the connection. Operation proceeds from step 926 to the input of step 918.

Returning to step 919, in step 919, which is performed on an ongoing basis, the wireless terminal, monitors for input data to be transmitted, e.g., input user data input sourced user I/O devices, user data selected, and/or user data resulting from processing, intended to be communicated to a peer device via traffic signaling. Various types of user data include, e.g., voice data, image data, and/or file data. Some types of user data, e.g., voice, have latency constraints regarding transmission while other types, e.g., some data files may not. Some types of user data are best effort traffic while other types of user data are quality of service constrained data. Corresponding to some particular portion of traffic, e.g., some voice packets, the urgency for transmission may change over time, e.g. as a function of the amount of time it has been waiting in a transmission queue.

For detected input, operation proceeds from step 919 to steps 921, 925 and 929. In step 921 the wireless terminal stores data to be transmitted as queued transmission traffic data 923. In step 923 the wireless terminal stores destination information corresponding to the data to be transmitted as destination information 927, e.g., identifying a peer node, a node identifier and/or a connection identifier. In step 929, the wireless terminal stores quality of service information associated with the data to be transmitted as QoS information of queued traffic 916. Operation may, and sometimes does, proceed from step 929 to step 931. In step 931 the wireless terminal updates QoS information, e.g., corresponding to queued traffic to be transmitted which has not been transmitted. For example, the wireless terminal may increase a Quality of Service level associated with the wireless terminal's transmissions when some latency dependent data waiting to be transmitted has missed several traffic transmission slots or is getting dangerously close to being dropped.

Returning to step 930, in step 930 the wireless terminal tests whether it has a connection identifier and desires to transmit traffic to the peer device with which it has the connection. If the condition of step 930 is not satisfied, then operation returns to the input of step 930 for another test at a later point in time. However, if the wireless terminal does hold a connection identifier and does desire to transmit traffic data to the peer with which it has the connection, then operation proceeds from step 930 to step 932.

In step 932 the wireless terminal determines a request block priority as a function of quality of service requirements of traffic waiting to be transmitted. Step 932 includes sub-step 933 in which the wireless terminal uses historical information 916 to make the request block priority determination. Operation proceeds from step 932 to step 934.

In step 934 the wireless terminal proceeds differently depending upon the request block priority determination of step 932. If the wireless terminal determines that it is to have high request block priority then operation proceeds from step 934 to step 936. However, if the wireless terminal determines that it is to have low request block priority, then operation proceeds from step 934 to step 938.

Returning to step 936, in step 936 the wireless terminal transmits a traffic request in the high priority transmission request block directed to the wireless terminal with which it has a connection. Then in step 938 the wireless terminal monitors the high priority request response block for a request response signal from the wireless terminal with which it has a connection. Operation proceeds from step 938 to step 940.

In step 940, if the wireless terminal has not detected a request response signal from the wireless terminal to which it send the request, then operation proceeds from step 940 to step 946, where the wireless terminal ends the traffic transmission attempt for this traffic slot. However, if the wireless terminal has detected a request response signal, e.g., an RX echo signal signifying a positive response to the request, from the wireless terminal to which it had sent the request, then operation proceeds from step 940 to step 942.

In step 942, the wireless terminal makes a decision whether to transmit a repeat transmission request in the low priority transmission request block or cancel the request as a function of transmitter yielding protocol rules. Operation proceeds from step 942 to step 944.

Returning to step 948, in step 948 the wireless terminal is controlled to refrain from transmitting a traffic request in the high priority transmission request block. Operation proceeds from step 948 to step 950. In step 950, the wireless terminal makes a decision whether or not to transmit a traffic transmission request in a low priority transmission request block as a function of transmitter yielding protocol rules. Operation proceeds from step 950 to step 944.

In step 944 the wireless terminal proceeds differently depending upon the decision of step 942 or 950. If the decision was not to transmit, then operation proceeds from step 944 to step 946, where the wireless terminal ends the traffic transmission attempt for this traffic slot. However, if the decision was to transmit, then, operation proceeds from step 944 to step 952.

In step 952 the wireless terminal transmits the request in the low priority request block, and subsequently in step 953 the wireless terminal monitors for a request response in the low priority request response block. Operation proceeds from step 953 to step 954.

In step 954 the wireless terminal proceeds differently depending upon whether or not a request response signal, e.g. an RX echo signal signifying a positive answer to the transmission request, was received from the wireless terminal to which the request was transmitted in step 952. If a request response is not received, then operation proceeds to step 946, where the wireless terminal ends the traffic transmission attempt for this traffic slot. However, if a request response signal was received from the wireless terminal to which the request was directed, then operation proceeds from step 954 to step 956. In step 956 the wireless terminal makes a transmitter yielding decision in accordance with protocol rules.

Operation proceeds from step 956 to step 960. In step 960 the wireless terminal proceeds differently depending on the transmitter yielding decision of step 956. If the decision is to yield, operation proceeds from step 960 to step 946, where the wireless terminal ends the traffic transmission attempt for the traffic slot. However, if the decision is not to yield, then operation proceeds from step 960 to step 962. In step 962, the wireless terminal transmits traffic data in the traffic slot segment associated with the request resources which carried the one or more requests.

Operation proceeds from step 946 or step 962 via connecting node A 928 to step 930, where the wireless terminal checks if it still holds a connection identifier and if it has traffic that it desires to transmit to the wireless terminal associated with connection.

Various aspects of methods and apparatus for providing multiple levels of Quality of Service (QoS) in a wireless network with low overhead signaling are described in this application. Various embodiments pertain to implementing and/or utilizing mechanisms for providing distributed QoS over a peer-to-peer wireless network. Over distributed wireless networks, absolute guarantees, e.g., strict rate requirement per user, hard deadline guarantee, probabilistic deadline guarantee, etc., are very expensive to implement, both in terms of system capacity as well as messaging overheads. Various methods and apparatus provide multiple levels of relative QoS guarantees for a large class of users, along with mean or probabilistic delay guarantees (so called absolute guarantees) for a small class of users, e.g., voice users or TCP ACKs, using low overhead signaling (one or a few bits).

In various embodiments, transmitters and/or receivers of links, wherein a link corresponds to a transmitter-receiver pair, request for QoS in a probabilistic (deterministic) manner. In some such embodiments, the request probability (rate) is a function of the QoS request load within the link's sensing radius. As the number of links requesting QoS grows, the request probability of each link decreases, hence controlling the overall QoS request load over any spatial domain.

At each time instant, one exemplary approach uses one or a few QoS request bits to separate the active links into classes indexed by the QoS request level. The active links are links that have data to transmit. QoS class is, e.g., an instantaneous level of QoS. For example, with one bit, we can achieve a separation into two classes, where an active link with QoS bit=0 is of class-0, and an active link with QoS bit=1 is of class-1. With k bits, we can have up to $2^k$ classes.

By controlling the request probability as a function of time differently for each link, multiple grades of QoS (QoS grade: Long-term QoS specification per link), where the number of grades are larger than the number of classes, can be implemented with very few bits (one or a few bits) of explicit signaling per link.

An exemplary implementation along with the associated QoS grades is described below. Consider a time-synchronous system, i.e., time is slotted, with 1-bit of signaling per link for prioritized QoS request. This system includes two QoS classes, e.g., two instantaneous QoS levels, per time slot, henceforth referred to as the high and low priority class. Note that the membership in these two classes changes with time.

The links that get transmit opportunity in each time slot is determined by distributed matching. Distributed matching is a procedure to determine a collection of links that can simultaneously transmit without causing significant interference to each other. Distributed matching includes, e.g., RX yielding and/or TX yielding considerations. While matching, the sample implementation first matches from links that are of high priority, i.e., those links that have QoS bit=1; and subsequently matches links that are of lower priority. This scheme ensures that lower priority transmissions do not cause significant interference to matched high priority links. Within each QoS class, in some embodiments, the link ordering is randomly chosen.

In one exemplary embodiment each link measures the following quantities.

$Q_m(t)$=Average QoS use by link m $W_L(t)$ measures the perceived QoS request load on the system $Q_m(t+1)=(1-\gamma) Q_m(t) \gamma I$ {link m used QoS bit at t} where $\gamma$ is a parameter between (0, 1)

$$W_L(t) = \sqrt[L]{\sum_m Q_m^L(t)}$$

QoS per-link parameters: $(\alpha_m, \beta_m)$ are utilized $\alpha_m$: Non-persistent parameter, $\alpha_m$~[0, 1]

$\beta_m$: Persistent parameter (e.g., a parameter used by voice traffic)

The pair $(\alpha_m, \beta_m)$ specifies a long-term QoS grade of service. The collection of each of the allowable pairs specifies each of the possible grades of QoS service that the system supports. Since each link can potentially choose a unique pair of parameters, the number of grades of QoS service that the system can support is arbitrarily large.

QoS global parameters: (L, c) are also utilized.

An exemplary QoS algorithm used in some embodiments will now be described.

---

At each time, a link requesting QoS sets the bit = 1 with a probability $p_m(t)$
$p_m(t) = \min [1, \max [ I\{\text{Persistent active}\}, c^2 \alpha_m / W_L(t))]]$
Persistent QoS mechanism: Tokens arrive at rate $\beta_m$
  Token can be used to request Persistent active
  If link m in matching, then token removed
  Token persistent until success
  Typically used for voice users to give delays guarantees
Non-persistent QoS mechanism: Data users have parameter $\alpha_m$
  Specifies a relative QoS
  As QoS load increases, non-persistent request probability decreases as described in the equation above.

---

Suppose there are N links desiring non-persistent QoS, with parameters $\{\alpha_m, 1, 2, \ldots, N\}$ which are different across links. Then, with L=0.5, the average number of links that request QoS (i.e., links that set their QoS bit=1 at a particular time-slot) is given by:

$$\sum_{m=1}^{N} p_m = c \left( \frac{\sum_{i=1}^{N} \alpha_i}{\sum_{i=1}^{N} \sqrt{\alpha_i}} \right)$$

Observe that because $0<\alpha_m<1$, the term in the brackets above is less than 1.

Thus, the average number of links that request QoS due to non-persistent links is bounded by c.

This implies that a (single) persistent link ($\beta$-link) will be scheduled for transmission with an average delay that is bounded by (c+1) time-slots Does not depend on the number of links in the system Implies that a "hard" guarantee given to voice users If there are K persistent ($\beta$) links, then the average number of links that set the QoS bit=1 is given by (c+K+1).

Aspects described above may be, and sometimes are, implemented in the method of flowchart 500 of FIG. 5, the method of flowchart 900 of FIG. 9 and/or the apparatus 600 of FIG. 6. Links are sometimes alternatively referred to as connections. A link with a QoS bit set=1, is in some embodiments, a link which has determined that it has the highest request block priority. While a link with a QoS bit set=0, is in some embodiments, a link which has determined that it has low request block priority.

The techniques of various embodiments may be implemented using software, hardware and/or a combination of software and hardware. Various embodiments are directed to apparatus, e.g., mobile nodes such as mobile access terminals, base stations including one or more attachment points, and/or communications systems. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, determining a first transmission priority, transmitting a first transmission request, making a decision whether or not to cancel a transmission request, repeating a transmission request, collecting information corresponding to other connections, updating historical information, transmitting traffic data. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first wireless terminal to communicate with a second wireless terminal different request blocks corresponding to a traffic transmission slot having different request block priorities, the method comprising:
monitoring for request signaling and request response signaling;
determining a first transmission priority based on the monitoring;
and when said determined first transmission priority is a highest request block priority, transmitting a first transmission request corresponding to a first traffic transmission slot using a transmission request block having the determined first transmission priority.

2. The method of claim 1, wherein the transmission request block having the highest request block priority temporally precedes another transmission request block having a lower request block priority.

3. The method of claim 1, wherein when said determined first transmission priority is a priority different from said highest request block priority, controlling said first wireless terminal to refrain from transmitting in said transmission request block having the highest request block priority.

4. The method of claim 2, wherein said first wireless terminal has a dedicated transmission unit in the highest priority transmission request block corresponding to said first traffic transmission slot and a dedicated transmission unit in the lower priority transmission request block corresponding to said first traffic transmission slot.

5. The method of claim 1, further comprising:
determining a second transmission priority, at a point in time subsequent to determining said first transmission priority, determining said second transmission priority being performed as a function of:
quality of service requirements of traffic data waiting to be transmitted by said first wireless terminal to said second wireless terminal.

6. The method of claim 5,
wherein determining the second transmission priority is also performed as a function of:
historical information based on at least one of: i) requests made in highest priority transmission request blocks and ii) responses detected in highest priority request response blocks.

7. The method of claim 6, further comprising:
updating, prior to making said second transmission priority determination, said historical information based on at least one of i) the number of transmission requests received in the highest transmission request block corresponding to said first traffic transmission slot and ii) the number of responses detected in highest priority request response block corresponding to the first traffic transmission slot.

8. The method of claim 7, wherein said historical information includes information corresponding to at least 50 preceding traffic transmission slots.

9. A method of operating a first wireless terminal to communicate with a second wireless terminal different request blocks corresponding to a traffic transmission slot having different request block priorities, the method comprising:
determining a first transmission priority;
and when said determined transmission priority is a highest request block priority, transmitting a first transmission request corresponding to a first traffic transmission slot using a transmission request block having the first determined transmission priority
wherein:
the transmission request block having the highest request block priority temporally precedes a transmission request block having a lower request block priority,
when said determined transmission priority is the highest, making a decision whether or not to cancel the requested transmission, based on a least one signal received from another device, said signal being transmitted in one of a transmission request block and a highest priority transmission request response block corresponding to said first traffic transmission slot.

10. The method of claim 9,
wherein the first wireless terminal has a dedicated transmission unit within the highest priority transmission request response block, different transmission units within the highest priority request response block having different transmission unit priorities; and
wherein making said decision is performed as a function of said different transmission unit priorities when said signal is a signal received in the highest priority request response block.

11. The method of claim 9,
wherein when said decision is not to cancel the requested transmission, repeating said transmission request using a second transmission request block having a lower request block priority than said highest request block priority.

12. The method of claim 9, wherein at most two different transmission request block priorities are supported for said first traffic transmission slot, and
wherein said determined first priority is different from said highest request block priority, the method further comprising:
controlling said first wireless terminal to refrain from transmitting in said transmission request block having the highest request block priority.

13. A first wireless terminal comprising:
a monitoring module for monitoring for request signaling and request response signaling;
a priority determination module for determining a first transmission priority for a first traffic transmission slot, said first traffic transmission slot being part of a timing structure including transmission request blocks and traffic transmission slots, wherein multiple transmission request blocks are associated with an individual traffic transmission slot and wherein different transmission request blocks corresponding to an individual traffic transmission slot have different request block priorities;
a wireless transmitter module; and
a transmission request control module for controlling the wireless transmitter module to transmit a transmission request corresponding to a first traffic transmission slot using a transmission request block having the determined first transmission priority when said determined first transmission priority is a highest request block priority.

14. The first wireless terminal of claim 13, wherein the transmission request block having the highest request block priority temporally precedes another transmission request block having a lower request block priority corresponding to the same traffic transmission slot.

15. The first wireless terminal of claim 14, wherein said stored timing structure information indicates that a dedicated transmission unit in the highest priority transmission request block corresponding to an individual traffic transmission slot has a corresponding dedicated transmission unit in the lower priority transmission request block corresponding to the same individual traffic transmission slot, the first wireless terminal further comprising:
a resource allocation module for obtaining information used to identify air link resources to be used by the first wireless terminal including a dedicated transmission unit in the highest priority transmission request block corresponding to an individual traffic transmission slot and a corresponding dedicated transmission unit in the lower priority transmission request block corresponding to the same individual traffic transmission slot.

16. The first wireless terminal of claim 14, further comprising:
a queued traffic quality of service requirements determination module for determining quality of service requirements of traffic data waiting to be transmitted by said first wireless terminal to said second wireless terminal; and
wherein said priority determination module is also for determining a second transmission priority, at a point in time subsequent to determining said first transmission priority; and
wherein said priority determination module determines said second transmission priority as a function of: quality of service requirements of traffic data waiting to be transmitted by said first wireless terminal to said second wireless terminal.

17. The first wireless terminal of claim 16,
wherein said priority determination module determines the second transmission priority as a function of historical information on at least one of: i) requests made in highest priority transmission request blocks and ii) responses detected in highest priority request response blocks.

18. The first wireless terminal of claim 17, further comprising:
a transmission request counting module for counting the number of transmission requests received in the highest transmission request block corresponding to said first traffic transmission segment;
a transmission request response counting module for counting the number of responses detected in highest priority request response block corresponding to the first traffic transmission slot; and
a historical information updating module for updating, prior to making said second transmission priority determination, said historical information based on at least one of: i) the number of transmission requests received in the highest transmission request block corresponding to said first traffic transmission segment and ii) the number of responses detected in the highest priority request response block corresponding to the first traffic transmission slot.

19. The first wireless terminal of claim 18,
wherein said historical information includes information corresponding to at least 50 preceding traffic transmission slots; and
wherein said priority determination module makes a determination using the information corresponding to the at least 50 preceding traffic transmission slots.

20. The first wireless of claim 13, wherein when said determined first transmission priority is a priority different from said highest request block priority, the transmission request control module controls said wireless transmitter module to refrain from transmitting in said transmission request block having the highest request block priority.

21. A first wireless terminal comprising:
a priority determination module for determining a first transmission priority for a first traffic transmission slot, said first traffic transmission slot being part of a timing structure including transmission request blocks and traffic transmission slots, wherein multiple transmission request blocks are associated with an individual traffic transmission slot and wherein different transmission request blocks corresponding to an individual traffic transmission slot have different request block priorities;
a wireless transmitter module; and
a transmission request control module for controlling the wireless transmitter module to transmit a transmission request corresponding to a first traffic transmission slot using a transmission request block having the first determined transmission priority when said determined first transmission priority is a highest request block priority wherein the transmission request block having the highest request block priority temporally precedes a transmission request block having a lower request block priority corresponding to the same traffic transmission slot; and
a transmission request cancellation decision module for making a decision whether or not to cancel the requested transmission when said determined transmission priority is the highest, based on at least one signal received from another device, said received signal being transmitted in one of a transmission request block and a highest priority transmission request response block corresponding to said first traffic transmission slot.

22. The first wireless terminal of claim 21, further comprising:
memory including stored timing structure information, said stored timing structure information indicating that there are a plurality dedicated transmission units within the highest priority transmission request response block and different transmission units within the highest priority request response block have different transmission unit priorities; and
wherein said transmission request cancellation decision module makes said decision as a function of said different transmission unit priorities when said signal is a signal received in the highest priority request response block.

23. The first wireless terminal of claim 21, further comprising:
a transmission request repeat module for controlling the transmission request control module to control the wireless transmitter module to repeat said transmission request using a second transmission request block having a lower request block priority than said highest request block priority when said decision of said transmission request cancellation decision module is not to cancel the requested transmission.

24. The first wireless terminal of claim 21,
wherein said stored timing structure information indicates that at most two different transmission request block priorities are supported for said first traffic transmission slot; and
wherein said transmission request control module controls said first wireless terminal to refrain from transmitting in said transmission request block having the highest request block priority when said priority determination module determines that said first priority is different from said highest request block priority.

25. A first wireless terminal comprising:
Monitoring means for monitoring request signaling and request response signaling;
priority determination means for determining a first transmission priority for a first traffic transmission slot, said first traffic transmission slot being part of a timing structure including transmission request blocks and traffic transmission slots, wherein multiple transmission request blocks are associated with an individual traffic transmission slot and wherein different transmission request blocks corresponding to an individual traffic transmission slot have different request block priorities;
wireless transmitter means; and
transmission request control means for controlling the wireless transmitter means to transmit a transmission request corresponding to a first traffic transmission slot using a transmission request block having the first determined transmission priority when said determined first transmission priority is a highest request block priority.

26. The first wireless terminal of claim 25, wherein the transmission request block having the highest request block priority temporally precedes a transmission request block having a lower request block priority corresponding to the same traffic transmission slot.

27. The first wireless of claim 25, wherein when said determined first transmission priority is a priority different from said highest request block priority, the transmission request control means controls said wireless transmitter module to refrain from transmitting in said transmission request block having the highest request block priority.

28. A first wireless terminal comprising:
priority determination means for determining a first transmission priority for a first traffic transmission slot, said first traffic transmission slot being part of a timing structure including transmission request blocks and traffic transmission slots, wherein multiple transmission request blocks are associated with an individual traffic transmission slot and wherein different transmission request blocks corresponding to an individual traffic transmission slot have different request block priorities;
wireless transmitter means;
transmission request control means for controlling the wireless transmitter means to transmit a transmission request corresponding to a first traffic transmission slot using a transmission request block having the first determined transmission priority when said determined first transmission priority is a highest request block priority wherein the transmission request block having the highest request block priority temporally precedes a transmission request block having a lower request block priority corresponding to the same traffic transmission slot; and
transmission request cancellation decision means for making a decision whether or not to cancel the requested transmission when said determined transmission priority is the highest, based on at least one signal received from another device, said received signal being transmitted in one of a transmission request block and a highest priority transmission request response block corresponding to said first traffic transmission slot.

29. The first wireless terminal of claim 28, further comprising:
memory means including stored timing structure information, said stored timing structure information indicating that there are a plurality dedicated transmission units within the highest priority transmission request response block and different transmission units within the highest priority request response block have different transmission unit priorities; and
wherein said transmission request cancellation decision means makes said decision as a function of said different transmission unit priorities when said signal is a signal received in the highest priority request response block.

30. A computer program product for use in a first wireless terminal which communicates with a second wireless terminal different request blocks corresponding to a traffic transmission slot having different request block priorities, the computer program product comprising:
computer-readable medium comprising:
code for monitoring for request signaling and request response signaling;
code for causing a computer to determine a first transmission priority; and
code for causing a computer to transmit a first transmission request corresponding to a first traffic transmission slot using a transmission request block having the first determined transmission priority, when said determined transmission priority is a highest request block priority.

31. The computer program product of claim 30, wherein the transmission request block having the highest request block priority temporally precedes a transmission request block having a lower request block priority.

32. The computer program product of claim 30, wherein said computer-readable medium further comprises:
code for causing a computer to control said first wireless terminal to refrain from transmitting in said transmission request block having the highest request block priority when said determined transmission priority is a priority different from said highest request block priority.

33. An apparatus for use in a first wireless terminal which communicates with a second wireless terminal in a network different request blocks corresponding to a traffic transmission slot having different request block priorities, the apparatus comprising:
a processor configured to:
monitor for request signaling and request response signaling;
determine a first transmission priority; and
transmit a first transmission request corresponding to a first traffic transmission slot using a transmission request block having the first determined transmission priority, when said determined transmission priority is a highest request block priority.

34. The apparatus of claim 33, wherein the transmission request block having the highest request block priority temporally precedes a transmission request block having a lower request block priority.

35. The apparatus of claim 33, wherein said processor is further configured to:
control said first wireless terminal to refrain from transmitting in said transmission request block having the highest request block priority when said determined transmission priority is a priority different from said highest request block priority.

* * * * *